United States Patent
Usui et al.

(10) Patent No.: US 7,978,902 B2
(45) Date of Patent: Jul. 12, 2011

(54) CALIBRATION METHOD, INSPECTION METHOD, AND SEMICONDUCTOR DEVICE MANUFACTURING METHOD

(75) Inventors: Satoshi Usui, Yokohama (JP); Koji Hashimoto, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 973 days.

(21) Appl. No.: 11/898,323

(22) Filed: Sep. 11, 2007

(65) Prior Publication Data

US 2008/0063255 A1    Mar. 13, 2008

(30) Foreign Application Priority Data

Sep. 11, 2006  (JP) ................................ 2006-245909

(51) Int. Cl.
- *G06K 9/00* (2006.01)
- *G01D 18/00* (2006.01)
- *G06G 7/62* (2006.01)

(52) U.S. Cl. .......... 382/145; 382/149; 382/151; 702/85; 703/13

(58) Field of Classification Search .......... 382/100, 382/141, 145, 148, 149, 151; 341/120, 144, 341/126; 702/107, 79, 178, 69, 85; 703/1, 703/2, 4, 13, 6; 700/110, 90, 95, 108, 109; 713/503, 500; 348/87, 153; 600/443; 347/43, 347/19

See application file for complete search history.

(56) References Cited

U.S. PATENT DOCUMENTS

| | | | | |
|---|---|---|---|---|
| 6,487,511 | B1 * | 11/2002 | Wooten | 702/84 |
| 6,661,912 | B1 * | 12/2003 | Taguchi et al. | 382/145 |
| 6,868,175 | B1 * | 3/2005 | Yamamoto et al. | 382/145 |
| 7,221,788 | B2 * | 5/2007 | Schulze et al. | 382/144 |
| 7,241,993 | B2 * | 7/2007 | Nakasuji et al. | 250/310 |
| 7,280,945 | B1 * | 10/2007 | Weiner et al. | 703/2 |
| 7,523,027 | B2 * | 4/2009 | Chang et al. | 703/13 |

FOREIGN PATENT DOCUMENTS

JP    9-312318    12/1997

* cited by examiner

*Primary Examiner* — Sheela C Chawan
(74) *Attorney, Agent, or Firm* — Finnegan, Henderson, Farabow, Garrett & Dunner, L.L.P.

(57) ABSTRACT

According to an aspect of the invention, there is provided a calibration method of performing contrast threshold calibration in extracting a pattern edge from an image of a pattern formed on a processing target substrate, including simulating formation of the pattern to detect a portion predicted to have shorted or opened in the pattern, calculating a contrast of an image of the pattern including the portion predicted to have shorted or opened, and determining a threshold from the contrast, the threshold avoiding extraction of a pattern edge in the portion predicted to have shorted or opened.

17 Claims, 7 Drawing Sheets

CALIBRATION METHOD, INSPECTION METHOD, AND SEMICONDUCTOR DEVICE MANUFACTURING METHOD

CROSS-REFERENCE TO RELATED APPLICATIONS

This application is based upon and claims the benefit of priority from prior Japanese Patent Application No. 2006-245909, filed Sep. 11, 2006, the entire contents of which are incorporated herein by reference.

BACKGROUND OF THE INVENTION

1. Field of the Invention

The present invention relates to a calibration method applied to the inspection of a pattern formed on a processing target substrate, an inspection method using this method, and a semiconductor device manufacturing method.

2. Description of the Related Art

In recent years, a demand for micropatterning semiconductor integrated circuits is increasing. To meet this demand, a more complicated device pattern is formed on a processing target substrate such as a wafer. It is therefore becoming difficult to determine OK (good)/NG (bad) of the pattern formed on the wafer only by observing it. Under the circumstances, the Die-to-Database inspection is becoming mainstream. In the Die-to-Database inspection, a pattern edge is extracted from a pattern image formed on a wafer, and the extracted pattern edge is compared with a target design to inspect the wafer pattern.

In view of this, threshold calibration is very important in extracting a pattern edge from an image. If the calibration is inappropriate, accurate pattern edge extraction may fail to result in an oversight of a defective pattern.

Jpn. Pat. Appln. KOKAI Publication No. 9-312318 discloses a pattern defect inspection apparatus which compares a detected wafer pattern image with a prestored reference pattern image and detects the difference as a wafer pattern defect.

BRIEF SUMMARY OF THE INVENTION

According to an aspect of the invention, there is provided a calibration method of performing contrast threshold calibration in extracting a pattern edge from an image of a pattern formed on a processing target substrate, comprising: simulating formation of the pattern to detect a portion predicted to have shorted or opened in the pattern; calculating a contrast of an image of the pattern including the portion predicted to have shorted or opened; and determining a threshold from the contrast, the threshold avoiding extraction of a pattern edge in the portion predicted to have shorted or opened.

According to another aspect of the invention, there is provided an inspection method of performing contrast threshold calibration in extracting a pattern edge from an image of a pattern formed on a processing target substrate, comprising: simulating formation of the pattern to detect a portion predicted to have shorted or opened in the pattern; calculating a contrast of an image of the pattern including the portion predicted to have shorted or opened; determining a threshold from the contrast, the threshold avoiding extraction of a pattern edge in the portion predicted to have shorted or opened; and inspecting the pattern formed on the processing target substrate, on the basis of the extracted pattern edge.

According to another aspect of the invention, there is provided a semiconductor device manufacturing method of manufacturing a semiconductor device using a processing target substrate inspected by performing contrast threshold calibration in extracting a pattern edge from an image of a pattern formed on the processing target substrate, comprising: simulating formation of the pattern to detect a portion predicted to have shorted or opened in the pattern; calculating a contrast of an image of the pattern including the portion predicted to have shorted or opened; determining a threshold from the contrast, the threshold avoiding extraction of a pattern edge in the portion predicted to have shorted or opened; inspecting the pattern formed on the processing target substrate, on the basis of the extracted pattern edge; and manufacturing the semiconductor device using the inspected processing target substrate.

DETAILED DESCRIPTION OF THE INVENTION

Embodiments of the present invention will be described below with reference to the accompanying drawing.

Figure 1:
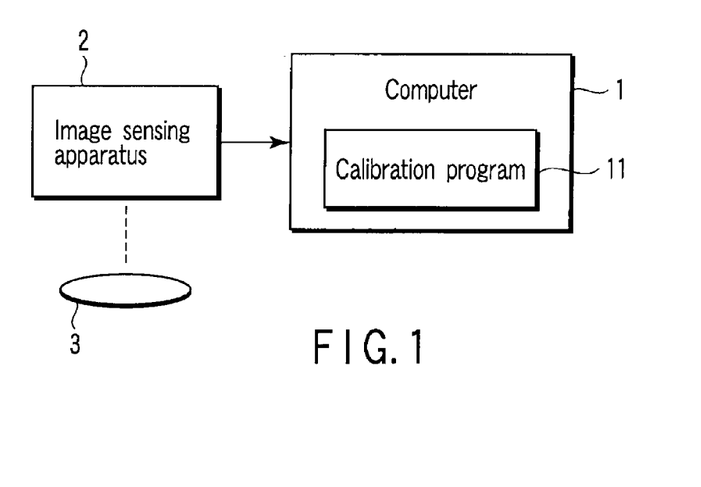
FIG. 1 is a block diagram showing a configuration of a system for performing calibration methods according to the embodiments of the present invention.

FIG. 1 is a block diagram showing a configuration of a system for performing calibration methods according to embodiments of the present invention. A calibration method according to the embodiment is performed by executing a calibration program 11 stored in a recording medium incorporated in a computer 1. An image sensing apparatus 2 senses a pattern formed in a metal layer (or another layer) on a semiconductor wafer (processing target substrate) 3 to be inspected. The computer 1 calculates the contrast of the obtained pattern image, performs contrast threshold calibration, and extracts a pattern edge.

The computer 1 simulates the formation of the pattern in advance to detect a portion (a potential short or open pattern without any process margin (Hot Spot)) predicted to have shorted or opened in the pattern.

FIGS. 2A, 2B, 2C, and 2D are views for explaining a general calibration method and show pattern images (white portions in the upper views are patterns) and their contrast waveforms. FIGS. 2A, 2B, 2C, and 2D show a large pattern, small pattern, main body pattern 1, and main body pattern 2, respectively, on a wafer.

Figure 2A:
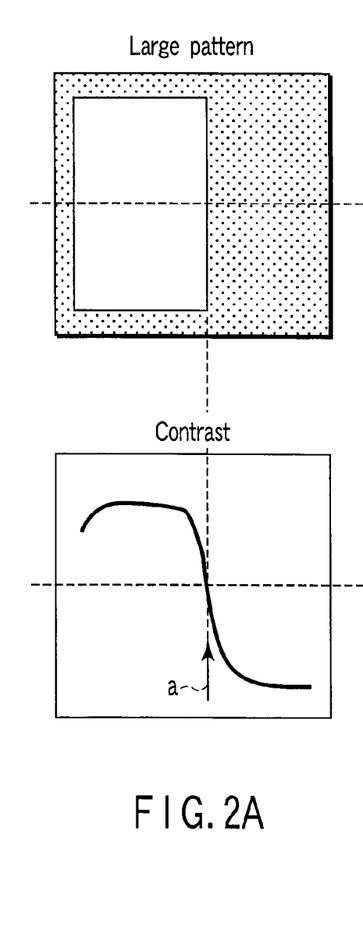
FIGS. 2A to 2D are views for explaining a general calibration method.
Figure 2B:
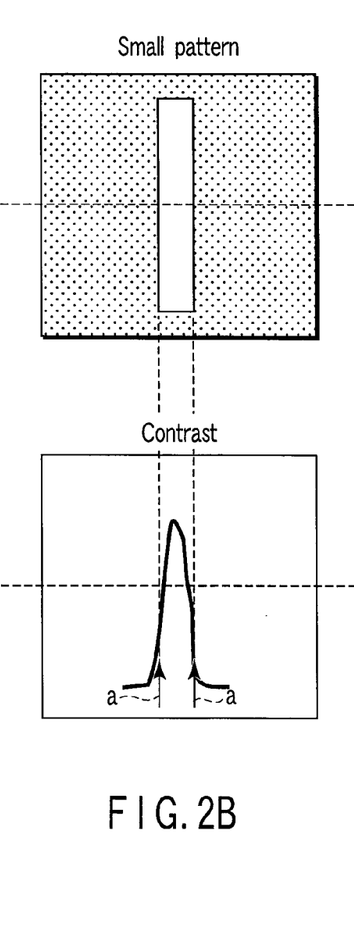
Figure 2C:
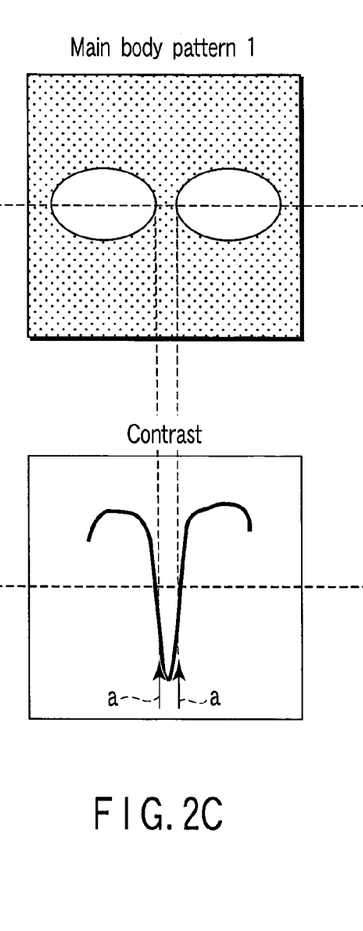
Figure 2D:
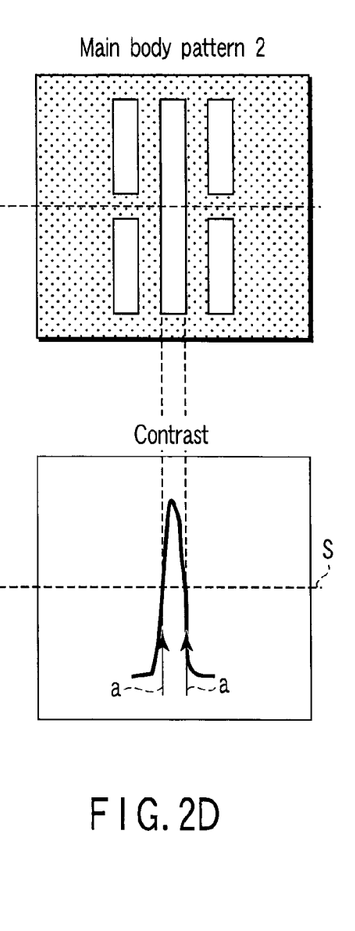

FIGS. 2A, 2B, 2C, and 2D exemplify a pattern edge extraction technique. As shown in FIGS. 2A and 2B, the image contrast of a certain large pattern or small pattern formed on a wafer is calculated to determine a threshold S to be able to accurately extract a pattern edge as indicated by an arrow a on the basis of the calculated contrast. The threshold S is also applied to main patterns 1 and 2 as shown in FIGS. 2C and 2D to extract pattern edges.

Figure 3A:
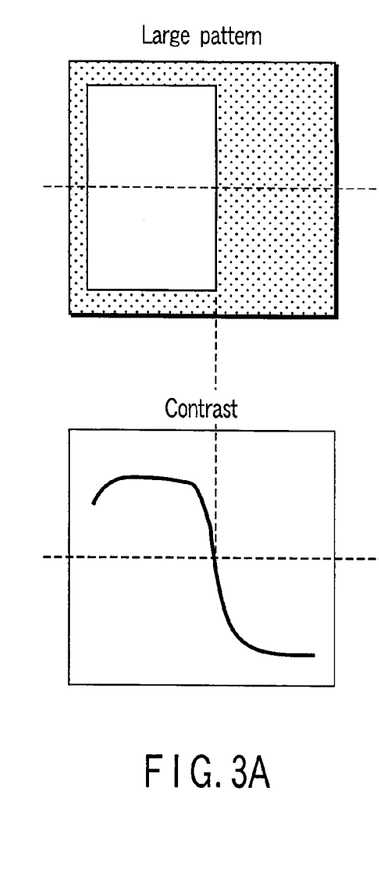
FIGS. 3A to 3D are views for explaining a problem of the general calibration method.
Figure 3B:
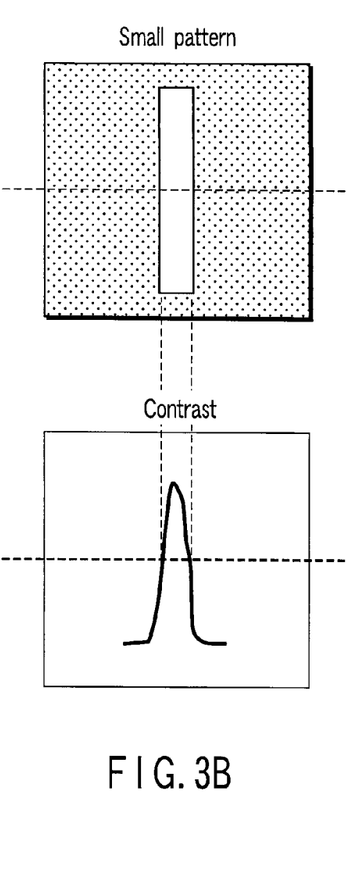
Figure 3C:
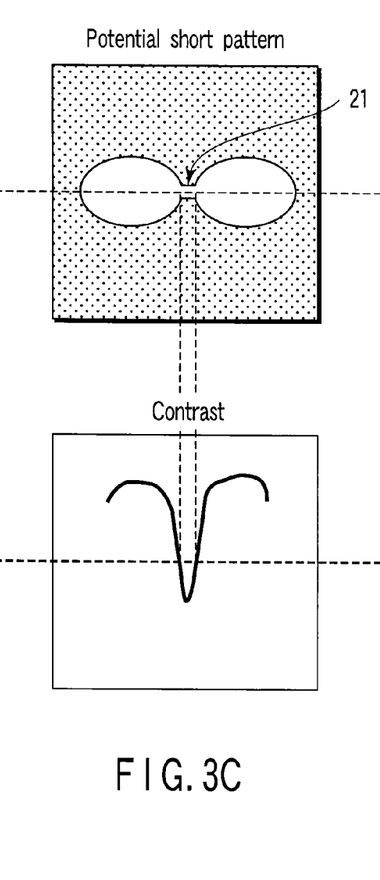
Figure 3D:
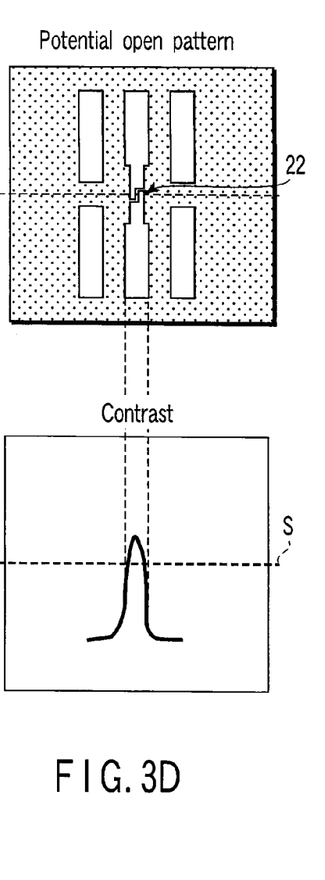
Figure 4A:
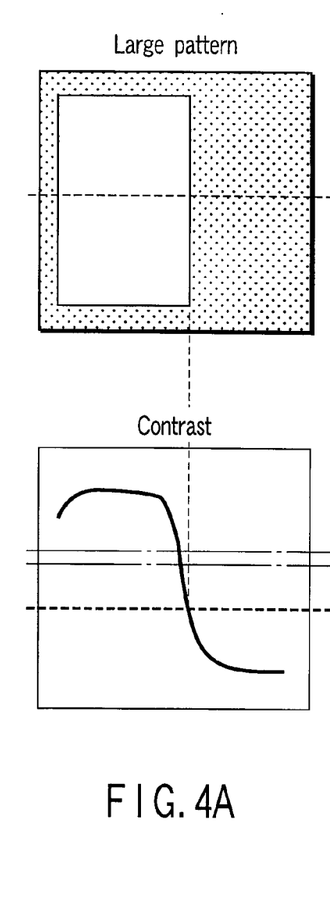
FIGS. 4A to 4D are views for explaining a calibration method according to the first embodiment.
Figure 4B:
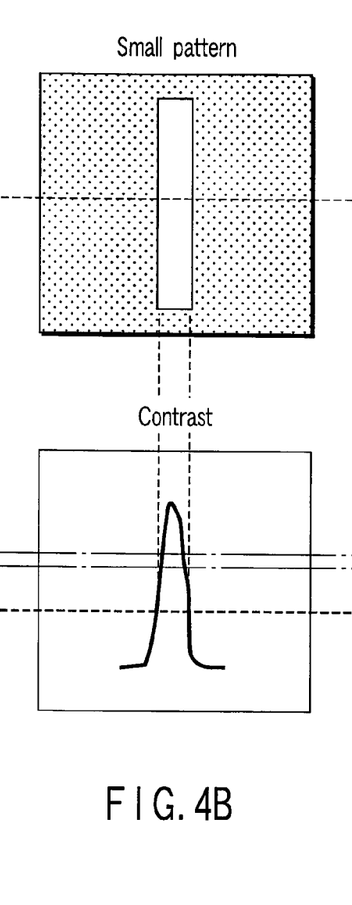
Figure 4C:
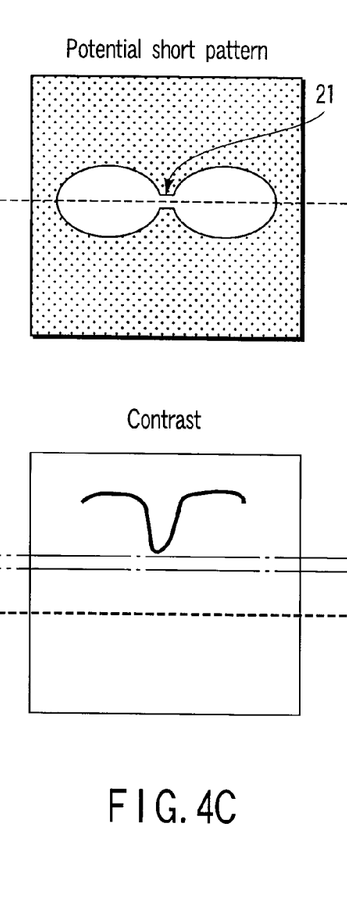
Figure 4D:
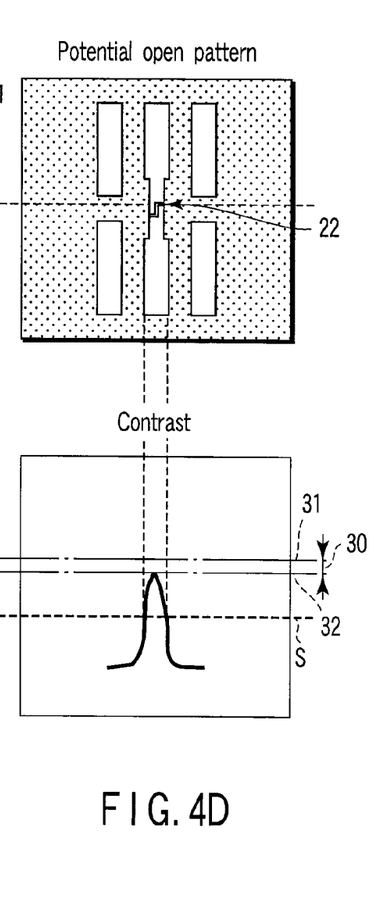

FIGS. 3A, 3B, 3C, and 3D are views for explaining a problem of the above-described calibration method. The techniques shown in FIGS. 2A, 2B, 2C, and 2D are advantageous to easy calibration. Assume, however, that the contrast is slightly higher than that of a case where any short portion is not present, which is due to the presence of a slight short portion 21 (shorted portion, potential short pattern), as shown in FIG. 3C, or the contrast is slightly lower than that of a case where any open portion is not present, which is due to the presence of a slight open portion 22 (opened portion, potential open pattern), as shown in FIG. 3D. In these cases, these portions may be erroneously extracted as pattern edges. This leads to erroneous determination that neither short nor open portion is present.

FIGS. 4A, 4B, 4C, and 4D are views for explaining a calibration method according to the first embodiment. To solve the above-described problem, a threshold S is determined within a contrast value range 30 between a minimum contrast value 31 of a portion where the contrast is slightly higher than that of a case where any short portion is not present (a case where any short portion is not predicted by the simulation), which is due to the presence of a slight short portion 21 shown in FIG. 4C and a maximum contrast value 32 of a portion where the contrast is slightly lower than that of a case where any open portion is not present (a case where any open portion is not predicted by the simulation), which is due to the presence of a slight open portion 22 shown in FIG. 4D. This threshold calibration avoids the extraction of a pattern edge in a portion predicted to have a defect to prevent the slight short portion 21 and slight open portion 22 from being erroneously extracted as pattern edges. Even when the pattern has a slight short or open portion, it is never erroneously recognized as a pattern edge. Hence, a defect portion such as a short or open portion of the pattern is never overlooked in the Die-to-Database inspection by referring to the extracted pattern edge.

FIGS. 5A, 5B, 5C, and 5D are views illustrating an example of a calibration method according to the second embodiment. Although a single threshold at which neither a slight short portion nor slight open portion is extracted as a pattern edge is determined in the first embodiment, no such threshold exists in some cases.

Figure 5A:
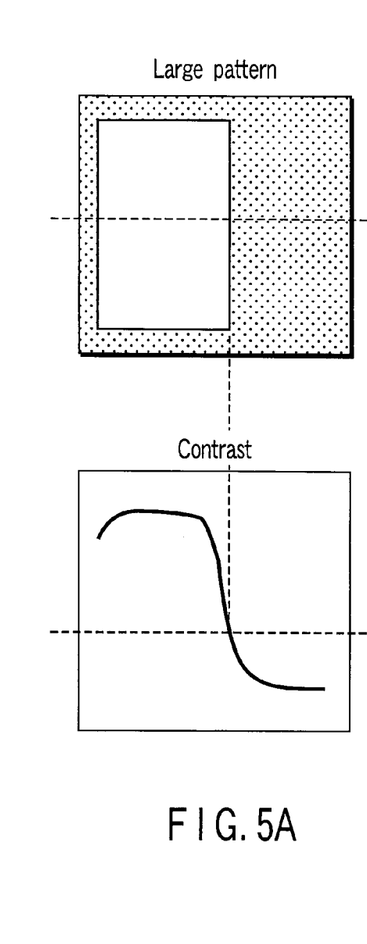
FIGS. 5A to 5D are views illustrating an example of a calibration method according to the second embodiment.
Figure 5B:
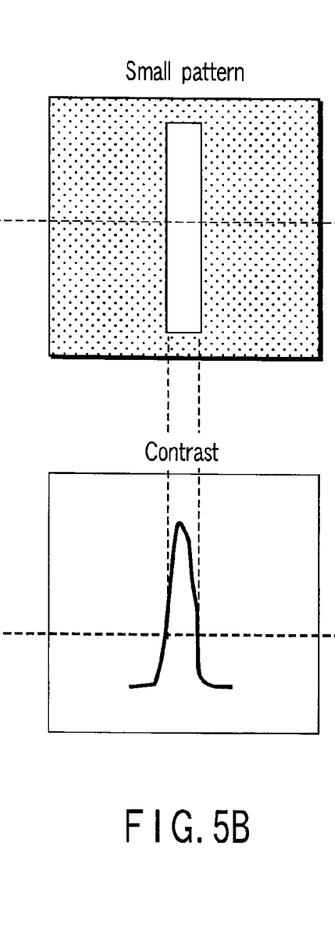
Figure 5C:
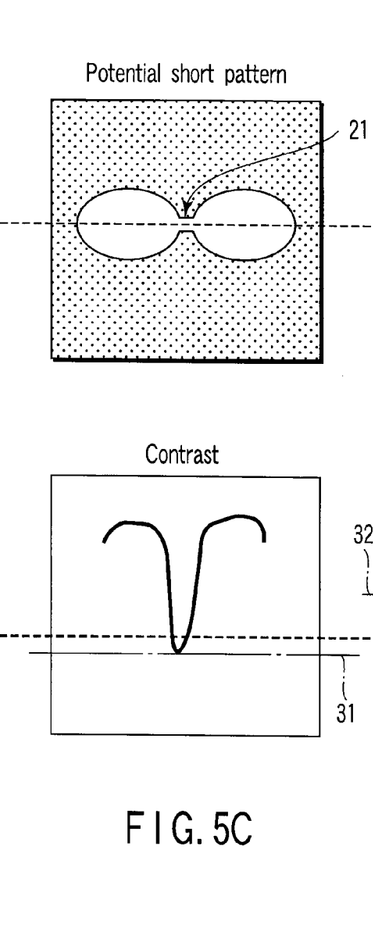
Figure 5D:
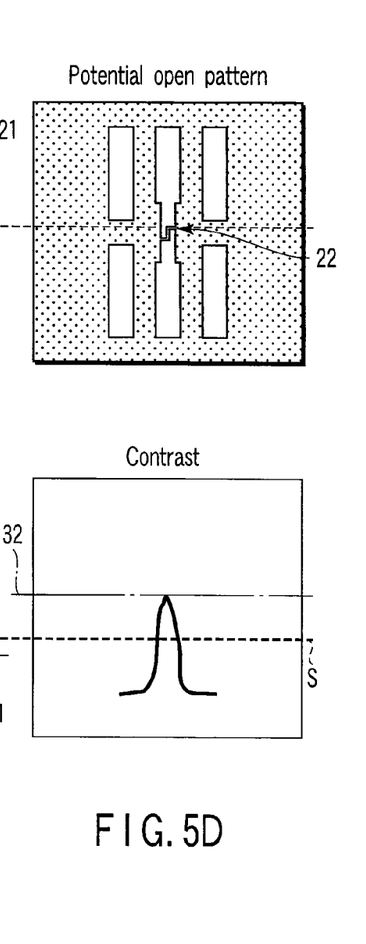

Referring to FIGS. 5C and 5D, a minimum contrast 31 of a portion where the contrast is slightly higher than that of a case where any short portion is not present (a case where any short portion is not predicted by the simulation), which is due to the presence of a slight short portion 21, is lower than a maximum contrast 32 of a portion where the contrast is slightly lower than that of a case where any open portion is not present (a case where any open portion is not predicted by the simulation), which is due to the presence of a slight open portion 22. For this reason, no single threshold S at which neither a slight short portion nor slight open portion is extracted as a pattern edge exists.

Such a case can be coped with by separately providing a threshold to extract the pattern edge of a pattern having a slight short portion (a pattern in which a short portion is predicted by the simulation) and a threshold to extract the pattern edge of a pattern having a slight open portion (a pattern in which an open portion is predicted by the simulation) and extracting the pattern edge of each pattern.

Figure 6A:
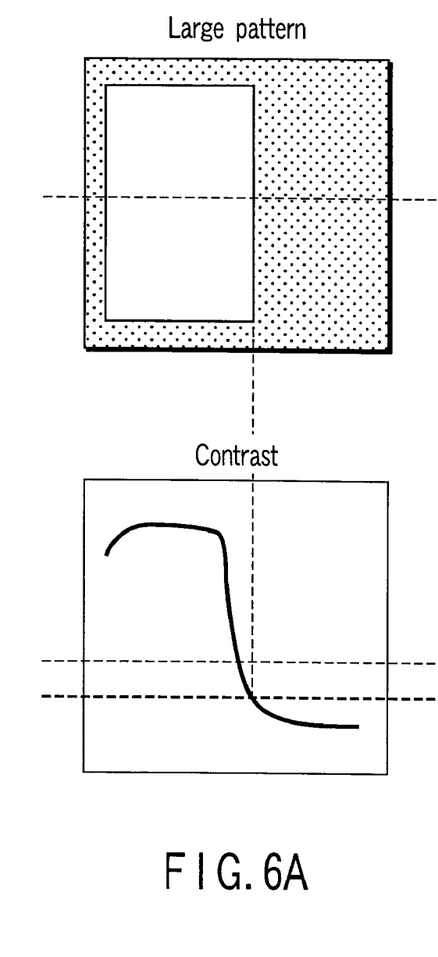
FIGS. 6A to 6C are views for explaining a calibration method according to the second embodiment.
Figure 6B:
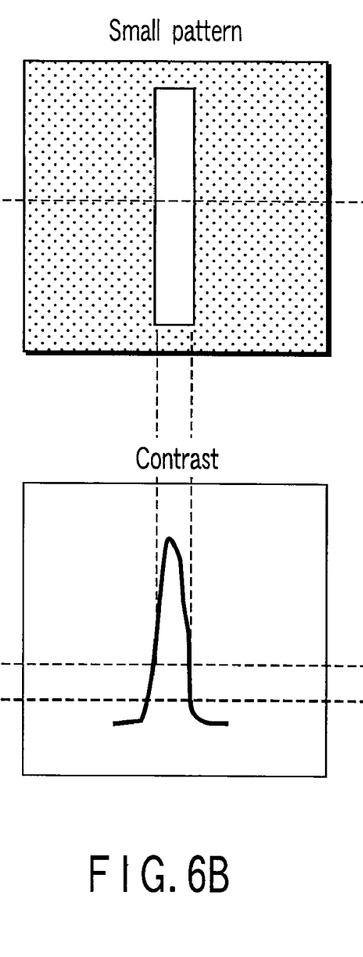
Figure 6C:
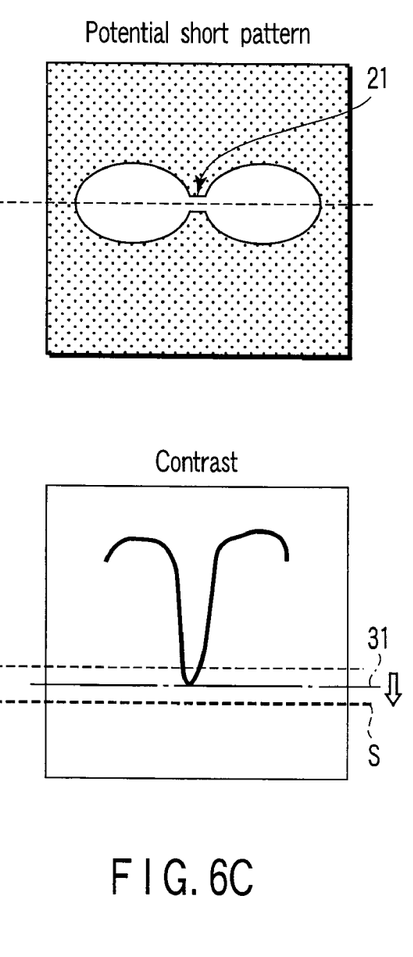

FIGS. 6A, 6B, 6C, 7A, 7B, and 7C are views for explaining calibration methods according to the second embodiment. When a pattern having a slight short portion 21 as shown in FIG. 6C is to be inspected, a threshold S is determined within a range equal to or lower than a minimum contrast value 31 of a portion where the contrast is slightly higher than that of a case where any short portion is not present (a case where any short portion is not predicted by the simulation), which is due to the presence of the slight short portion 21.

This threshold calibration avoids the extraction of a pattern edge in a portion predicted to have a defect to prevent a short portion from being erroneously extracted as a pattern edge. Even when the pattern has a slight short portion, it is never erroneously recognized as a pattern edge. This makes it possible to specify a correct short portion.

Figure 7A:
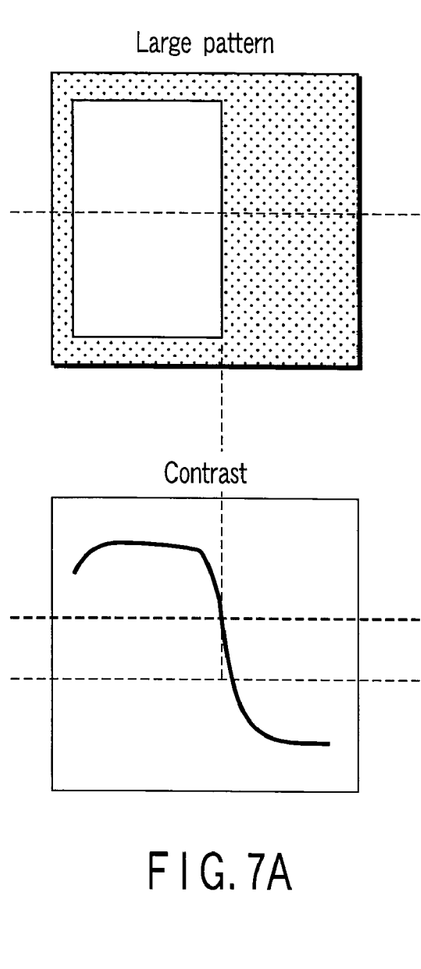
FIGS. 7A to 7C are views for explaining another calibration method according to the second embodiment.
Figure 7B:
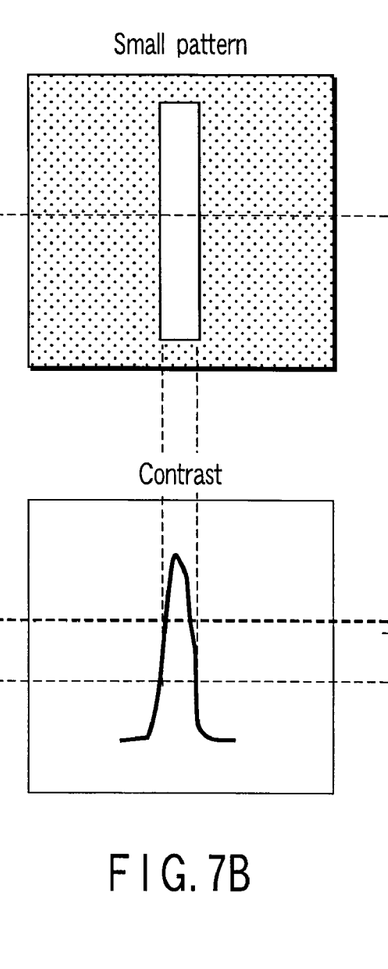
Figure 7C:
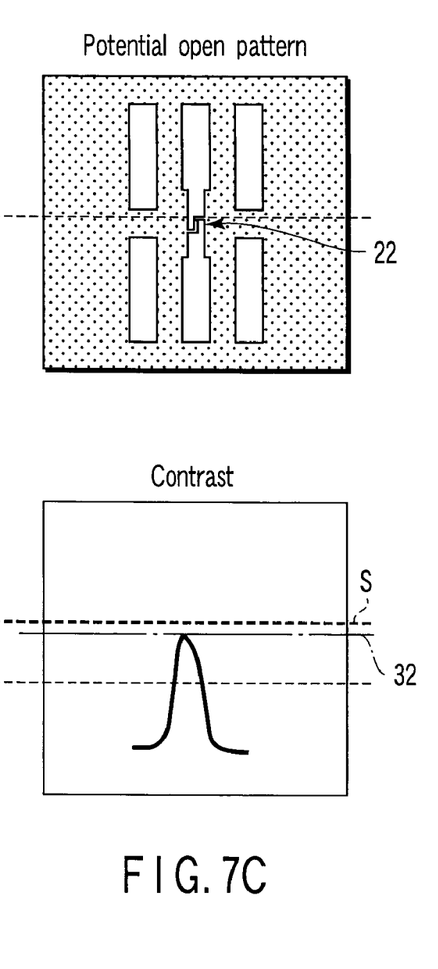

When a pattern having a slight open portion 22 as shown in FIG. 7C is to be inspected, a threshold S is determined within a range equal to or higher than a maximum contrast value 32 of a portion where the contrast is slightly lower than that of a case where any open portion is not present (a case where any open portion is not predicted by the simulation), which is due to the presence of the slight open portion 22.

This threshold calibration avoids the extraction of a pattern edge in a portion predicted to have a defect to prevent an open portion from being erroneously extracted as a pattern edge. Even when the pattern has a slight open portion, it is never erroneously recognized as a pattern edge. This makes it possible to correctly extract a pattern edge to specify a correct open portion.

Figure 8:
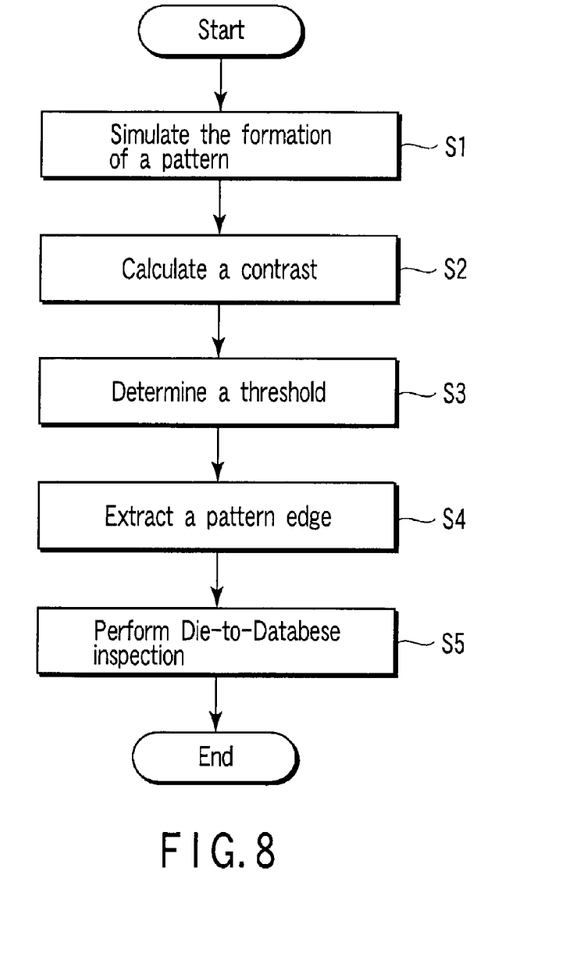
FIG. 8 is a flowchart showing a procedure of a semiconductor wafer inspection method in which the calibration of the embodiment is performed.

FIG. 8 is a flowchart showing a procedure of a semiconductor wafer inspection method in which the calibration of the embodiments is performed.

First, in step S1, the computer 1 simulates the formation of the pattern to detect a portion predicted to have a defect in the pattern. In step S2, the computer 1 calculates the contrast of the image of the patter formed on the semiconductor wafer 3 sensed by the image sensing apparatus 2, that is to say the image including an image of a portion predicted to have a defect. In step S3, the computer 1 determines a threshold which avoids the extraction of a pattern edge in a portion predicted to have a defect. In step S4, the computer 1 extracts a pattern edge by using the determined threshold. In step S5, the computer 1 performs the Die-to-Database inspection for the pattern formed on the semiconductor wafer 3 on the basis of the extracted pattern edge.

As described above, according to this embodiment, neither a slight open portion nor slight short portion is erroneously recognized as a pattern edge to be extracted from a pattern image of a wafer. The Die-to-Database inspection for the wafer pattern using the correctly extracted pattern edge allows an accurate pattern defect inspection. In addition, a satisfactory semiconductor device is manufactured using a wafer having undergone the pattern inspection in this way.

Examples of a pattern predicted to have a slight short portion or slight open portion are a line/space pattern, isolated line pattern, and isolated space defined by the minimum design rule.

According to this embodiment, it is possible to provide a calibration method which can accurately extract a pattern edge, an inspection method, and a semiconductor device manufacturing method.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A calibration method of performing contrast threshold calibration in extracting a pattern edge from an image of a pattern formed on a processing target substrate, comprising:
    simulating formation of the pattern to detect a portion predicted to have shorted or opened in the pattern;
    calculating a contrast of an image of the pattern including the portion predicted to have shorted or opened; and
    determining a threshold from the contrast, the threshold avoiding extraction of a pattern edge in the portion predicted to have shorted or opened.

2. The method according to claim 1, wherein the threshold is determined within a contrast value range between a minimum contrast value of a portion where a contrast is increased due to the shorted portion and a maximum contrast value of a portion where a contrast is decreased due to the opened portion.

3. The method according to claim 1, wherein the threshold is determined within a contrast value range equal to or lower than a minimum contrast value of a portion where a contrast is increased due to the shorted portion.

4. The method according to claim 1, wherein the threshold is determined within a contrast value range equal to or higher than a maximum contrast value of a portion where a contrast is decreased due to the opened portion.

5. The method according to claim 1, wherein the determination of the threshold is performed by determining a first threshold and a second threshold separately, the first threshold avoiding extraction of a pattern edge in the portion predicted to have shorted and the second threshold avoiding extraction of a pattern edge in the portion predicted to have opened.

6. An inspection method of performing contrast threshold calibration in extracting a pattern edge from an image of a pattern formed on a processing target substrate, comprising:
    simulating formation of the pattern to detect a portion predicted to have shorted or opened in the pattern;
    calculating a contrast of an image of the pattern including the portion predicted to have shorted or opened;
    determining a threshold from the contrast, the threshold avoiding extraction of a pattern edge in the portion predicted to have shorted or opened; and
    inspecting the pattern formed on the processing target substrate, on the basis of the extracted pattern edge.

7. The method according to claim 6, wherein the threshold is determined within a contrast value range between a minimum contrast value of a portion where a contrast is increased due to the shorted portion and a maximum contrast value of a portion where a contrast is decreased due to the opened portion.

8. The method according to claim 6, wherein the threshold is determined within a contrast value range equal to or lower than a minimum contrast value of a portion where a contrast is increased due to the shorted portion.

9. The method according to claim 6, wherein the threshold is determined within a contrast value range equal to or higher than a maximum contrast value of a portion where a contrast is decreased due to the opened portion.

10. The method according to claim 6, wherein the determination of the threshold is performed by determining a first threshold and a second threshold separately, the first threshold avoiding extraction of a pattern edge in the portion predicted to have shorted and the second threshold avoiding extraction of a pattern edge in the portion predicted to have opened.

11. The method according to claim 6, wherein the inspection of the pattern is the Die-to-Database inspection.

12. A semiconductor device manufacturing method of manufacturing a semiconductor device using a processing target substrate inspected by performing contrast threshold calibration in extracting a pattern edge from an image of a pattern formed on the processing target substrate, comprising:
    simulating formation of the pattern to detect a portion predicted to have shorted or opened in the pattern;
    calculating a contrast of an image of the pattern including the portion predicted to have shorted or opened;
    determining a threshold from the contrast, the threshold avoiding extraction of a pattern edge in the portion predicted to have shorted or opened;
    inspecting the pattern formed on the processing target substrate, on the basis of the extracted pattern edge; and
    manufacturing the semiconductor device using the inspected processing target substrate.

13. The method according to claim 12, wherein the threshold is determined within a contrast value range between a minimum contrast value of a portion where a contrast is increased due to the shorted portion and a maximum contrast value of a portion where a contrast is decreased due to the opened portion.

14. The method according to claim 12, wherein the threshold is determined within a contrast value range equal to or lower than a minimum contrast value of a portion where a contrast is increased due to the shorted portion.

15. The method according to claim 12, wherein the threshold is determined within a contrast value range equal to or higher than a maximum contrast value of a portion where a contrast is decreased due to the opened portion.

16. The method according to claim 12, wherein the determination of the threshold is performed by determining a first threshold and a second threshold separately, the first threshold avoiding extraction of a pattern edge in the portion predicted to have shorted and the second threshold avoiding extraction of a pattern edge in the portion predicted to have opened.

17. The method according to claim 12, wherein the inspection of the pattern is the Die-to-Database inspection.

* * * * *